US007680479B2

(12) United States Patent
Nishida

(10) Patent No.: US 7,680,479 B2
(45) Date of Patent: Mar. 16, 2010

(54) URGENT MESSAGE APPARATUS AND SYSTEM

(75) Inventor: Junichi Nishida, Aichi-ken (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 691 days.

(21) Appl. No.: 11/526,565

(22) Filed: Sep. 26, 2006

(65) Prior Publication Data

US 2010/0035543 A1 Feb. 11, 2010

(30) Foreign Application Priority Data

Oct. 24, 2005 (JP) ............................ 2005-308819

(51) Int. Cl.
*H04B 1/16* (2006.01)

(52) U.S. Cl. ................ 455/343.6; 455/567; 455/569.2; 455/572; 455/11.1; 455/427; 370/311

(58) Field of Classification Search ................ 455/572, 455/574, 90.1, 90.2, 67.11, 404.2, 404.1, 455/11.1, 427, 569.2, 567, 345, 343–343.6; 370/318, 315, 316; 701/200, 201, 202, 207, 701/213

See application file for complete search history.

(56) References Cited

U.S. PATENT DOCUMENTS 6,112,054 A * 8/2000 Kita .......................... 455/12.1
6,721,580 B1 * 4/2004 Moon ......................... 455/574
7,312,696 B2 * 12/2007 Flick ..................... 340/426.18
2005/0200479 A1 * 9/2005 James .................. 340/539.18

FOREIGN PATENT DOCUMENTS

JP 8-181643 7/1996
JP 11-272974 10/1999

* cited by examiner

*Primary Examiner*—Kamran Afshar
*Assistant Examiner*—Ezana Getachew
(74) *Attorney, Agent, or Firm*—Finnegan, Henderson, Farabow, Garrett & Dunner, LLP

(57) ABSTRACT

An urgent message apparatus mounted in a vehicle, for transmitting, in an emergency, an urgent message with a backup battery with the use of a low-earth orbit orbiting satellite, detects a current position of the vehicle; a obtaining part obtaining a communication not-possible time zone of the low-earth orbit orbiting satellite, for the current position of the vehicle detected by the position detecting part; calculates a power amount to be consumed when the backup battery is maintained in a transmission standby state during the communication not-possible time zone obtained by the obtaining part; measures remaining power of the backup battery; compares a sum of a power amount required for transmitting the urgent message and the power amount calculated by the calculating part, with the remaining power measured by the measuring part; and determines that charging or replacement of the backup battery is required when the sum is larger.

4 Claims, 3 Drawing Sheets

URGENT MESSAGE APPARATUS AND SYSTEM

BACKGROUND OF THE INVENTION

1. Field of the Invention

The present invention generally relates to an urgent message apparatus mounted in a vehicle, for transmitting, in an emergency, an urgent message with the use of a backup battery by means of a low-earth orbit orbiting satellite, and, in particular, to an urgent message apparatus and system for appropriately warning of timing at which the backup battery should be charged or replaced.

2. Description of the Related Art

An urgent message (or a so-called mayday) apparatus and system are known in which, in an emergency, a backup battery is used, and an urgent message is transmitted with the use of cellular phone telephone network (see Japanese Laid-open Patent Applications Nos. 11-272974, 2000-231686, 2000-324039 and 2000-341196, referred to as patent documents 1 through 4, respectively, for example).

Further, an urgent message apparatus and system are known in which, in an emergency, with the use of a cellular phone instead of an in-vehicle apparatus, and an urgent message is transmitted with the use of a low-earth orbit (LEO) orbiting (not fixed) satellite communication (see Japanese Laid-open Patent Application No. 2001-250183, referred to as a patent document 5, for example).

In the low-earth orbit orbiting satellite communication, in contrast to a case of using fixed satellite communication, a time zone in which communication is not possible may occur even when an earth station is fixed at a same position on the ground, and thus, a system for providing information of a satellite communication possible time or time zone to an earth station user has been proposed (see Japanese Laid-open Patent Application No. 8-181643, referred to as a patent document 6, for example).

It is noted that, nowadays, such low-earth orbit orbiting satellite communication is actually put into a commercial use, for example, by ORBCOMM in the United States, Virginia (see Official site of ORBCOMM, URL: http://www.orbcomm.com/, Oct. 18, 2005, referred to as a non-patent document 1).

SUMMARY OF THE INVENTION

The above-mentioned patent documents 1 through 3 disclose that, for a life of a backup battery, it is determined whether or not replacement (in a case of a primary battery) or charging (in a case of a secondary battery) is actually required and a vehicle user is warned of the determination result as is necessary.

In such an apparatus/system in the prior arts, it is determined that the battery life has been expired (i.e., replacement/charging is required) when power or a voltage of the backup battery lowers under a certain threshold. In such an apparatus/system, as described above, it is assumed that a cellular phone telephone network is used for the urgent message, and the urgent message apparatus exists within an area of the cellular phone telephone network. That is, it is assumed that, in an emergency, communication can be rapidly established with a cellular phone base station.

Accordingly, in such an apparatus/system in the prior arts, it is possible to determine that battery replacement/charging timing has come, by detecting that power required for transmitting a signal indicating the urgent message is no longer left in the backup battery. A time duration required for the communication for transmitting the signal indicating the urgent message can be estimated with a fairly high accuracy according to the applied communication system. Thus, the power required for the communication can be estimated with a fairly high accuracy accordingly. As a result, in the apparatus/system in the prior arts employing the cellular phone telephone network, a fixed threshold can be applied for determining the battery remaining power/voltage at which replacement/charting of the battery is actually required.

However, in such an apparatus/system, it may not be possible to properly determine the backup battery replacement required timing or charging required timing when the low-earth orbit orbiting satellite communication system is applied for the urgent message communication in a country or a district in which a cellular phone telephone network is not sufficiently developed, for example.

As disclosed in the above-mentioned patent document 6, in the low-earth orbit orbiting satellite communication system, in terms of a communication system structure, a time zone in which the satellite does not appear above the earth station, and thus, communication is not available, occurs. The time and the time duration of this communication not-possible time zone depend on a manner in which the satellite is seen, and thus, they may depend on each particular position (district) of the earth station (i.e., the vehicle/urgent message apparatus).

When an emergency actually occurs just within the communication not-possible time zone by accident, the urgent message apparatus should wait until a communication possible time zone occurs (i.e., until the satellite appears above the urgent message apparatus). Then, the urgent message apparatus actually transmits the urgent message after the communication possible time zone occurs.

Thus, in a case of the urgent message apparatus using the low-earth orbit obtain satellite communication for the urgent massage, battery power actually required for carrying out the urgent message transmission should include, not only power corresponding to the required power consumption for the actual urgent message communication, but also, a maximum standby power amount which is consumed for waiting until the communication not-possible time zone has finished. This, only when the power including the maximum standby power amount is actually left in the backup battery, it can be said that battery replacement/charging is not required.

When the threshold for determining the battery remaining power/voltage at which battery replacement/charging is required is fixed at a relatively low level, the remaining power in the backup battery may run out during waiting for the finish of the communication not-possible time zone, in a district in which the communication not-possible time zone is relatively long and thus, the urgent message may not be actually transmitted.

Contrary, when the threshold of the battery remaining power/voltage at which battery replacement/charging is required is fixed at a relatively high level, a warning for urging of replacement/charging of the backup battery may be frequently generated even when the backup battery remaining power is still sufficient, in a district in which the communication not-possible time zone is relatively short.

Thus, the backup battery life determining way in the urgent message apparatus/system in the prior arts may not be suitable to be used together with the low-earth orbit orbiting satellite communication, and, in this technical field, an improved backup battery life determining way suitable for the low-earth orbit orbiting satellite communication is demanded.

The present invention has been devised for the purpose of solving this problem, and, an object of the present invention is to provide an urgent message apparatus/system by which timing to urge into backup battery replacement/charging can be appropriately warned of.

According to a first aspect of the present invention, an urgent message apparatus mounted in a vehicle, for transmitting, in an emergency, an urgent message with the use of a backup battery by means of a low-earth orbit orbiting satellite communication, includes a position detecting part detecting a current position of the vehicle; an obtaining part obtaining a communication not-possible time zone of the low-earth orbit orbiting satellite, for the current position of the vehicle detected by the position detecting part; a calculating part calculating a power amount required when the backup battery is kept in a transmission standby state during the communication not-possible time zone obtained by the obtaining part; a measuring part measuring remaining power of the backup battery; and a determining part comparing a sum of a power amount required for transmitting the urgent message and the power amount calculated by the calculating part, with the remaining power measured by the measuring part, and determining that charging or replacement of the backup battery is required when the sum is larger.

In this aspect, the obtaining part may periodically obtain the communication not-possible time zone; and the determining part may carry out the determination processing each time when the communication not-possible time zone is newly obtained by the obtaining part.

By this first aspect of the present invention, as a result of a length of the communication not-possible time zone of the low-earth orbit orbiting satellite communication according to the vehicle current position being appropriately considered, timing at which backup battery replacement or charging is actually required can be appropriately determined.

According to a second aspect of the present invention, an urgent message system in which an urgent message apparatus mounted in a vehicle transmits, in an emergency, an urgent message with the use of a backup battery by means of a low-earth orbit orbiting satellite, includes a center which manages the low-earth orbit orbiting satellite communication and carries out communication with the urgent message apparatus with the use of the low-earth orbit orbiting satellite communication, wherein the urgent message apparatus detects a current position of the vehicle; and transmits the detected vehicle current position to the center; when receiving the vehicle current position from the urgent message apparatus, the center transmits a communication not-possible time zone of the low-earth orbit orbiting satellite for this position, to the urgent message apparatus; the urgent message apparatus then receives the communication not-possible time zone from the center, calculates a power amount required when the backup battery is kept in a transmission standby state during the communication not-possible time zone, measures remaining power of the backup battery, and compares a sum of a power amount required for transmitting the urgent message and the power amount thus calculated, with the remaining power thus measured, and determining that charging or replacement of the backup battery is required when the sum is larger.

In this second aspect, the urgent message apparatus may periodically obtain, from the center, the communication not-possible time zone and determine whether or not charging or replacement of the backup battery is required.

By this second aspect of the present invention, as a result of a length of the communication not-possible time zone of the low-earth orbit orbiting satellite communication according to the vehicle current position being appropriately considered, timing at which backup battery replacement or charging is actually required can be appropriately determined.

Thus, according to the present invention, an urgent message apparatus and system by which timing at which backup battery replacement or charging is actually required can be appropriately warned of, can be provided.

BRIEF DESCRIPTION OF DRAWINGS

Other objects and further features of the present invention will become more apparent from the following detailed description when read in conjunction with the accompanying drawings.

DETAILED DESCRIPTION OF THE PREFERRED EMBODIMENT

A best mode for carrying out the present invention will now be described by citing an embodiment with reference to the accompanying drawings. It is noted that, a basic concept, a main hardware configuration, an operation principle, a basic control system and so forth of an urgent message apparatus/system, mounted in a vehicle, for transmitting, in an emergency, an urgent message with the use of a backup battery, are known by the person skilled in the art, and detailed description thereof is omitted.

Figure 1:
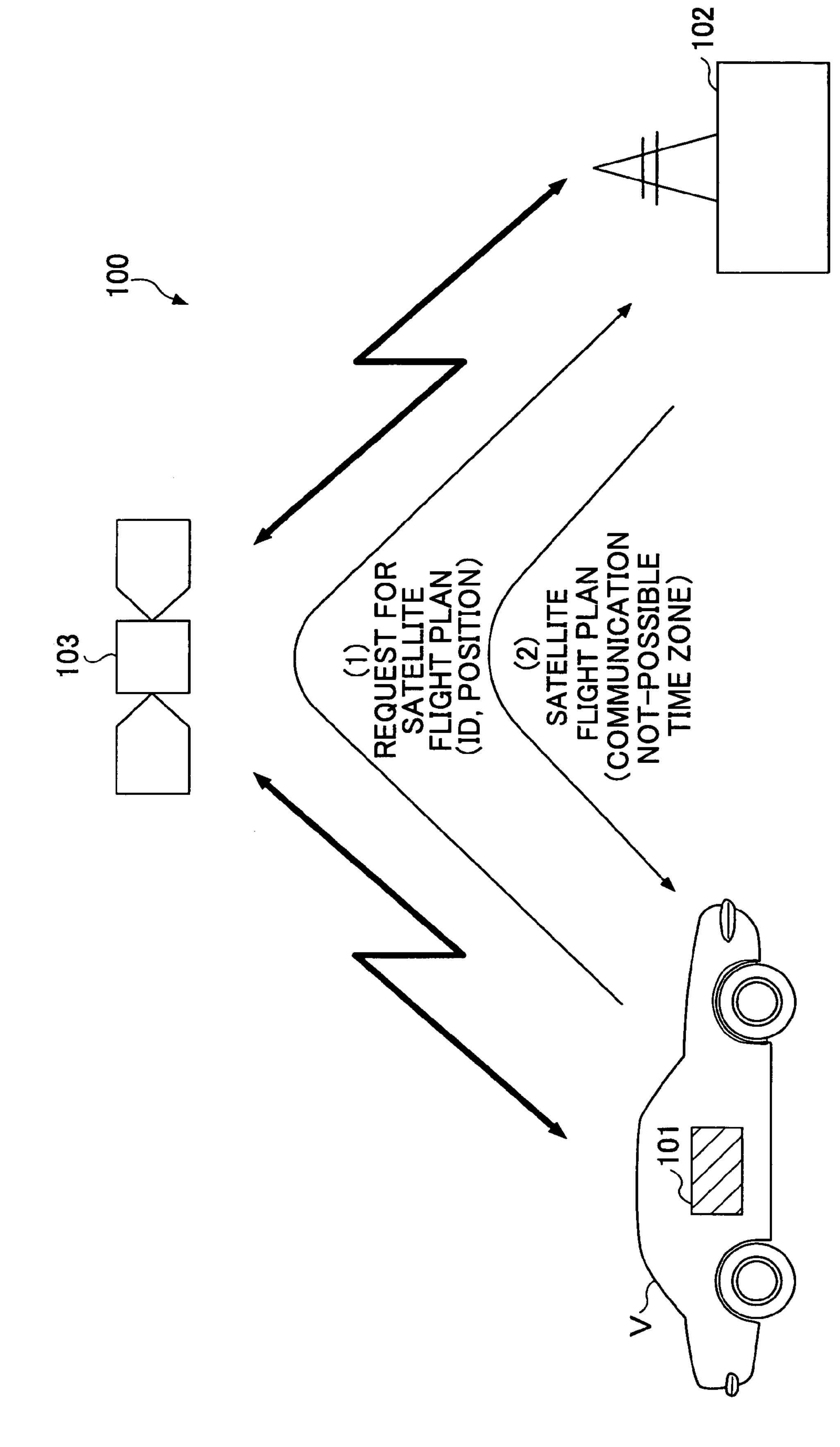
FIG. 1 shows a general diagram of the entirety of an urgent message system in one embodiment of the present invention.
Figure 2:
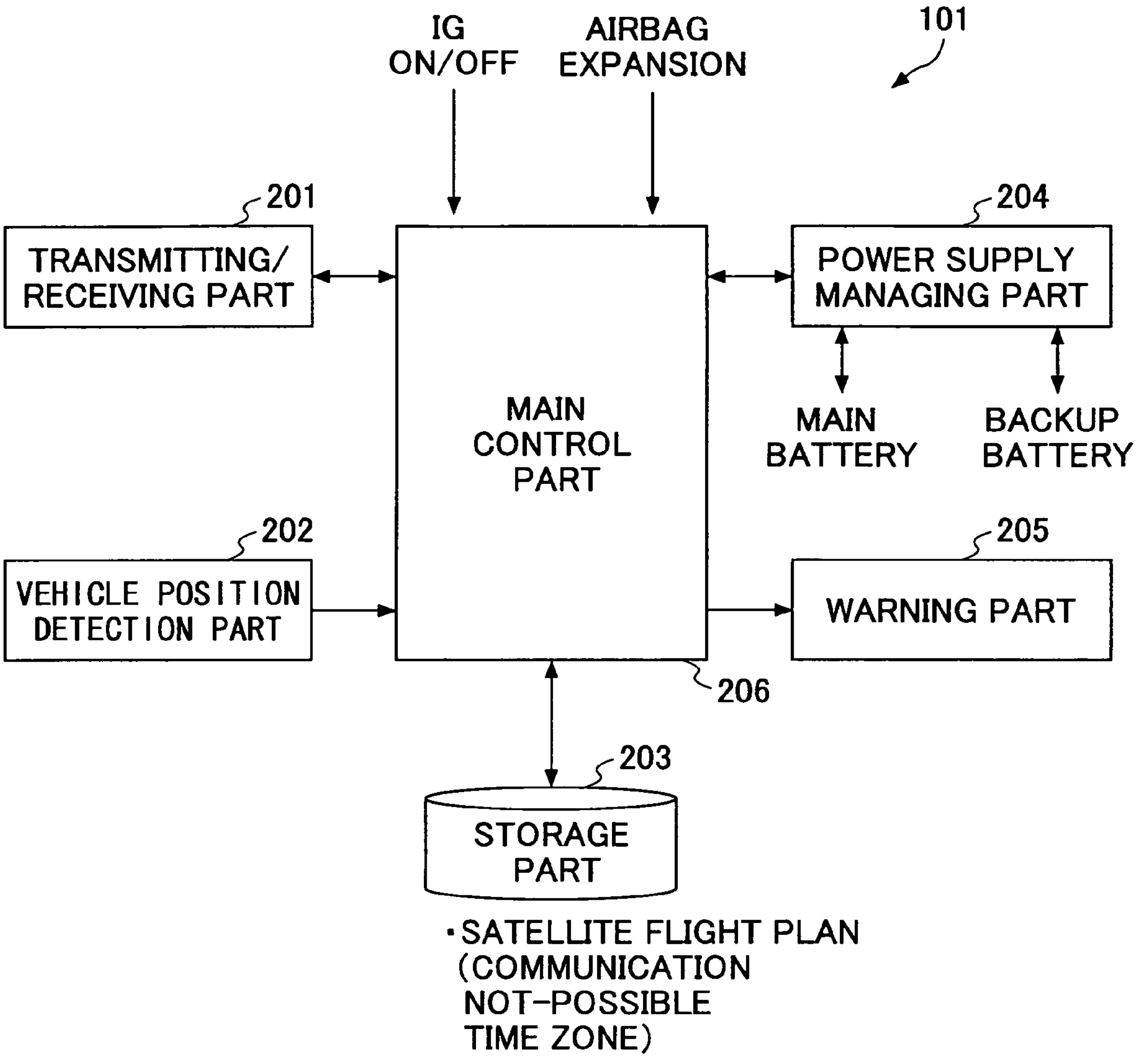
FIG. 2 shows a general diagram of the entirety of an urgent message apparatus in one embodiment of the present invention.
Figure 3:
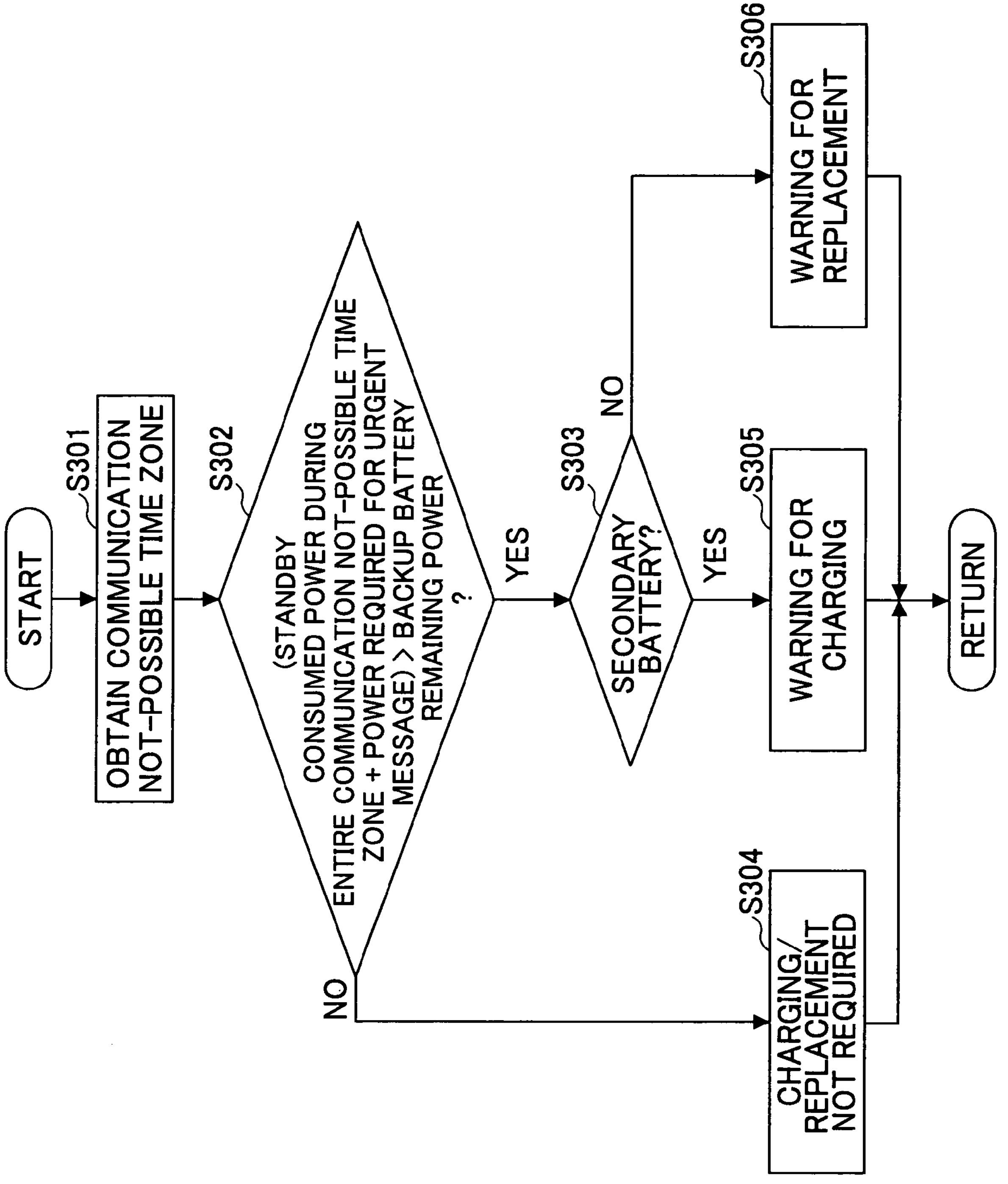
FIG. 3 shows a flow chart showing a flow of backup battery life determining processing carried out by the urgent message apparatus in the embodiment of the present invention.

With reference to FIGS. 1 through 3, an urgent message system in one embodiment of the present invention and an urgent message apparatus mounted in a vehicle in the urgent message system will now be described. In the urgent message system in the embodiment of the present invention, for example, the urgent message apparatus mounted in a corresponding service contracted vehicle determines that an emergency occurs, switches from a main battery to a backup battery, to be actually used, and issues an urgent message.

First, with reference to FIG. 1, the urgent message system 100 in the embodiment will now be generally described.

The urgent message system 100 in the embodiment includes the urgent message apparatus 101 mounted in the service contracted vehicle V and a center 102 which acts as an earth station managing a low-earth orbit orbiting satellite communication system.

A necessary configuration is provided such that the urgent message apparatus 101 and the center 102 can communication with one another via a low-earth orbit orbiting satellite 103 which the center 102 manages and operates. The center 102 has a gateway function, and responds to receiving an urgent message from the urgent message apparatus 101 via the low-earth orbit orbiting satellite 103, to transfer the urgent message to a predetermined destination such as a firefighting station, a police station or such.

In the present embodiment, the urgent message apparatus 101 transmits a vehicle ID of the own vehicle V (or, an apparatus ID of the urgent message apparatus 101 or a user ID of a vehicle driver) as well as a current position of the own vehicle V to the center 102 via the low-earth orbit orbiting satellite 103, and thus, makes a request for a satellite flight plan of the low-earth orbit orbiting satellite communication system managed by the center 102.

The center 102 produces the satellite flight plan regularly, for example, every week. Then, when receiving the request from the urgent message apparatus 101, the center 102 returns, to the urgent message apparatus 101 which is the request sender, a starting time and a duration (for example, ten minutes from 1 p.m.) of the communication not-possible time zone for the current position (or district), derived from the satellite flight plan for the position (or a predetermined extent of district including the position). It is noted that the communication not-possible time zone means a time zone during which the low-earth orbit orbiting satellite 103 does not appear above the vehicle V and thus, communication is not available therewith.

It is noted that, in FIG. 1, only the single service contracted vehicle V is shown, for the purpose of simplicity. It is possible that a plurality of vehicles (users) may contract to receive the service provided by the urgent message system 100 in the embodiment. Similarly, in FIG. 1, only the single low-earth orbit orbiting satellite 103 is shown, for the purpose of simplicity. Actually, a plurality of satellites are employed in the low-earth orbit orbiting satellite communication system in the embodiment.

FIG. 2 shows a general configuration diagram of the urgent message apparatus 101 mounted in the contracted vehicle V and communicating with the center 102 via the low-earth orbit-orbiting satellite 103.

The urgent message apparatus 101 has a transmitting/receiving part 201 for transmitting/receiving information to/from the center 102 via the low-earth orbit orbiting satellite 103. A communication protocol actually applied there may be any one, for example, TDMA, FDMA, CDMA or such, The urgent message apparatus 101 further has a vehicle position detecting part 202 for detecting a position of the own vehicle V, for example, with the use of a GPS (Global Positioning System). A higher detection accuracy or a finer resolution of the vehicle position detecting part 202 is preferable. For example, it is preferable to employ a high accuracy GPS such as a RTK (Real Time Kinematic)-GPS.

The urgent message apparatus 101 further has a storage part 203 for storing and holding the satellite flight plan (i.e., the starting time and the duration of the communication not-possible time zone) of the low-earth orbit orbiting satellite 103 received from the center 1.02. In the embodiment, the storage part 203 may be any type of a storage medium. It is preferable that the satellite flight plan stored in the storage part 203 is updated to the latest data in appropriate timing.

The urgent message apparatus 101 further has a power supply managing part 204 for managing a main battery and a backup battery which is provided for a possible trouble of the main battery in an emergency (each battery being not shown). Specifically, the power supply managing part 204 has a function of appropriately switching between the main battery and the backup battery, to be actually used, and also, has a function of measuring remaining power of each battery. Various methods for actually measuring the battery remaining power have been proposed, and any one thereof may be applied to the present embodiment.

The urgent message apparatus 101 further has a warning part 205 for warning the vehicle user of necessity of backup battery replacement or charging. Actual warning made by the warning part 205 may have a form of, for example, visual one such as a character message displayed on an instrument panel, lighting or blinking of an indicator, a hologram virtual image of a character message generated on a front window; acoustic one such as a voice message from a speaker; or any combination thereof.

The urgent message apparatus 101 further has a main control part 206 which carries out overall control of the respective parts of the urgent message apparatus 101. For example, the main control part 206 has a form of an ECU (Electronic Control Unit). A necessary configuration is provided such that IG (i.e., ignition switch) on/off information, and a fact that an airbag is expanded, are transmitted to the main control part 206.

The main control part 206 has a function such that, when the fact that the airbag has been expanded is transmitted to the main control part 206, the main control part 206 determines that an emergency (i.e., a vehicle crash accident or such) has occurred, and transmits an urgent message to a firefighting station, a police station or another communication station, via the transmitting/receiving part 201, the low-earth orbit orbiting satellite 103 and the center 102. Further, a necessary configuration is provided such that, when the emergency occurs just during the communication not-possible time zone, the main control part 206 and/or the transmitting/receiving part 201 waits for a coming of the communication possible time zone, and then, when the communication possible time zone has come, i.e., when the communication not-possible time zone has finished, the urgent message is transmitted immediately.

FIG. 3 shows a flow chart showing a flow of a backup battery life determining processing carried out by the urgent message apparatus 101. This processing is initiated by, for example, the user's (driver's) turning on of an ignition switch.

When this processing is started, the urgent message apparatus 101 first transmits a vehicle ID of the own vehicle V (or, the apparatus ID of the urgent message apparatus 101 or the user ID of the vehicle driver) as well as a current position of the own vehicle V detected by the vehicle position detecting part 202, to the center 102 via the transmitting/receiving part 201 and the low-earth orbit orbiting satellite 103, and thus, makes a request for a satellite flight plan of the low-earth orbit orbiting satellite communication system managed by the center 102. As a result, the communication not-possible time zone for the vehicle position is returned from the center 102 (Step S301).

Next, the main control part 206 stores the thus-obtained communication not-possible time zone in the storage part 203, compares it with power consumption characteristics in the urgent message apparatus 101, previously stored in the storage part 203, and calculates a power amount A which is required when the backup battery is kept in a transmission standby state during the communication not-possible time zone. Further, the main control part 206 reads a power amount B required for transmitting the urgent message via the transmitting/receiving part 201 during the communication possible time zone, the power amount B being previously stored in the storage part 203.

Further, the main control part 206 provides instructions to the power managing part 204 and thus causes the same to measure a remaining power amount C of the backup battery.

Then, the main control part 206 determines whether or not the following condition is met (or whether or not the following conditional expression holds) (Step S302):

$$(\text{power amount } A + \text{power amount } B) > \text{remaining power amount } C$$

The left side of the above conditional expression, i.e., 'power amount A+power amount B' shows a total power amount required in a case where, an emergency occurs simultaneously when the communication not-possible time zone starts, the urgent message apparatus 101 waits, through the entire duration of the communication not-possible time zone, for transmitting the urgent message, and after that, the urgent message is actually transmitted immediately after the communication not-possible time zone has finished and the communication possible time zone starts.

When the above-mentioned condition is not met (No in Step S302), it is determined that a sufficient power is still left in the backup battery for transmitting the urgent message even when the actual transmission of the urgent message is delayed through the entire duration of the communication not-possible time zone at the current vehicle position. Thus, it is determined (Step S304) that warning to urge into replacement or charging of the backup battery is not necessary.

On the other hand, when the above-mentioned condition is met (Yes in Step S302), this means that, when an emergency occurs and the urgent message is to be transmitted at the vehicle position, sufficient power for transmitting the urgent message will no longer be left in the backup battery if the actual transmission of the urgent message is waited for throughout the entire duration of the communication not-possible time zone until the communication not-possible time zone is finished and thus the communication possible time zone starts. Accordingly, in this case, it is determined that replacement or charging of the backup battery is necessary.

As a result, when the backup battery is a secondary battery (Yes in Step S303), the main control part 206 provides instructions to the warning part 205 and thus, causes the same to warn to urge the vehicle user into charging the backup battery (Step S305).

On the other hand, when the backup battery is a primary battery (No in Step S303), the main control part 206 provides instructions to the warning part 205 and thus, causes the same to warn to urge the vehicle user into replacement of the backup battery (Step S305).

Thus, in the present embodiment, the urgent message apparatus 101 obtains the communication not-possible time zone for the current position from the center 102, determines, in consideration of the power required for waiting for a transmission of the urgent message, that backup battery replacement/charging warning is not necessary when determining that the urgent message can be transmitted even if the actual transmission of the urgent message is delayed to the maximum extent caused by possible occurrence of the communication not-possible time zone. Then, when it is determined that the urgent message cannot be transmitted if the actual transmission is delayed to the maximum extent, it is determined that the warning is necessary. Thereby, it is possible to generate warning for backup battery replacement/charging in appropriate timing, i.e., neither too late nor too early. That is, it is possible to positively avoid a situation that warning is generated more than necessary, whereby it is possible to save costs required for the battery replacement/charging. Further, it is possible to appropriately avoid a situation that the backup battery remaining power runs out without generation of warning, whereby it is possible to improve feeling of security of the user to the system.

It is noted that in the above-mentioned embodiment, the urgent message apparatus 101 makes a request from the center 102 for the satellite flight plan and determines for the life of the backup battery when the ignition switch is turned on. However, an embodiment of the present invention is not limited thereto, and, for example, configuration may be provided such that, instead of or in addition to a case of turning on of the ignition switch, the urgent message apparatus 101 periodically transmits a request to the center for the satellite flight plan to obtain the latest satellite flight plan, and, each time when thus obtaining the satellite flight plan, the urgent message apparatus 101 carries out the above-mentioned determination as to whether or not the charging or the replacement of the backup battery is required.

Further, a configuration may be provided such that the center 102 transmits (pushes) the new satellite flight plan (i.e., the new communication not-possible time zone) to the urgent message apparatus 101, even when no corresponding request has been made by the urgent message apparatus 101, in a case where such a satiation that the satellite flight plan (especially, the communication not-possible time zone) is influenced occurs, i.e., a new satellite is launched and thus the total number of satellites changes in the system, a satellite of the plurality of low-earth orbit orbiting satellites 103 has a trouble and thus it breaks down, the orbits of the satellites are slightly changed, or such.

An embodiment of the present invention is not limited to such a case of employing low-earth orbit orbiting satellite communication system, and the present invention may also be applied to any other urgent message system employing a communication system which involves a time zone during which communication is not possible in terms of the system structure. A moving body in which the urgent message apparatus is mounted is not limited to a vehicle, and, for example, the urgent message apparatus may be mounted in a ship. Thus, the urgent message apparatus according to the present invention may be mounted in any type of a moving body, regardless of an appearance, a weight, a size, running characteristics and so forth thereof.

Thus, the present invention is not limited to the above-described embodiment, and variations and modifications may be made without departing from the basic concept of the present invention claimed below.

The present application is based on Japanese Priority Application No. 2005-308819, filed on Oct. 24, 2005, the entire contents of which are hereby incorporated herein by reference.

What is claimed is:

1. An urgent message apparatus mounted in a vehicle, for transmitting, in an emergency, an urgent message with the use of a backup battery by means of a low-earth orbit satellite, comprising:

a position detecting part detecting a current position of the vehicle;

an obtaining part obtaining a time period in which communication with the low-earth orbit satellite is unavailable, for the current position of the vehicle detected by said position detecting part;

a calculating part calculating a power amount required when said backup battery is kept in a transmission standby state during the time period in which communication with the low-earth orbit satellite is unavailable that is obtained by said obtaining part; and a measuring part measuring remaining power of said backup battery;

wherein said calculating part compares a sum of a power amount required for transmitting the urgent message and the power amount calculated by said calculating part, with the remaining power measured by said measuring part, and determining that charging or replacement of said backup battery is required when said sum is larger than the remaining power.

2. The urgent message apparatus as claimed in claim 1, wherein:

said obtaining part periodically obtains the time period in which communication with the low-rate orbit satellite is unavailable; and said determining part carries out the determination processing each time when the time period in which communication with the low-rate orbit satellite is unavailable is newly obtained by said obtaining part.

3. An urgent message system in which an urgent message apparatus mounted in a vehicle transmits, in an emergency, an urgent message with the use of a backup battery by means of a low-earth orbit satellite, comprising a center which manages said low-earth orbit satellite and carries out communication with said urgent message apparatus with the use of said low-earth orbit satellite, wherein:

said urgent message apparatus detects a current position of the vehicle; and transmits the detected vehicle current position to the center; and when receiving the vehicle current position from said urgent message apparatus, said center transmits time period in which communication with said low-earth orbit satellite is unavailable for said position, to said urgent message apparatus;

said urgent message apparatus then receives the time period in which communication with the low-earth orbit satellite is unavailable from the center;

calculates a power amount required when said backup battery is kept in a transmission standby state during said time period in which communication with the low-earth orbit satellite is unavailable;

measures remaining power of said backup battery; and compares a sum of a power amount required for transmitting the urgent message and the power amount thus calculated, with the remaining power thus measured, and determining that charging or replacement of said backup battery is required when said sum is larger than the remaining power.

4. The urgent message system as claimed in claim 3, wherein:

said urgent message apparatus periodically obtains, from the center, the time period in which communication with the low-earth orbit satellite is unavailable, and determines whether or not charging or replacement of said backup battery is required.

* * * * *